(12) United States Patent
Thompson

(10) Patent No.: US 12,344,410 B2
(45) Date of Patent: Jul. 1, 2025

(54) SYSTEMS AND METHODS INVOLVING DYNAMIC RECHARGE FEATURES AND FUNCTIONALITY FOR ELECTRIC VEHICLES, ELECTRIC HOMES AND/OR OTHER IMPLEMENTATIONS

(71) Applicant: Claiborn Thompson, Yulee, FL (US)

(72) Inventor: Claiborn Thompson, Yulee, FL (US)

( * ) Notice: Subject to any disclaimer, the term of this patent is extended or adjusted under 35 U.S.C. 154(b) by 25 days.

(21) Appl. No.: 18/114,282

(22) Filed: Feb. 27, 2023

(65) Prior Publication Data

US 2023/0202689 A1 Jun. 29, 2023

Related U.S. Application Data

(63) Continuation of application No. PCT/US2022/041945, filed on Aug. 29, 2022.
(Continued)

(51) Int. Cl.
*B64U 50/30* (2023.01)
*B60L 50/60* (2019.01)
*B60L 50/90* (2019.01)
*B64D 27/02* (2006.01)
*B64D 27/24* (2024.01)
(Continued)

(52) U.S. Cl.
CPC .............. *B64U 50/30* (2023.01); *B60L 50/60* (2019.02); *B60L 50/90* (2019.02); *B64D 27/24* (2013.01); *B64U 50/19* (2023.01); *F01D 15/10* (2013.01); *H02J 7/0049* (2020.01); *H02J 7/0063* (2013.01); *H02J 7/00712* (2020.01); *H02P 9/006* (2013.01); *B60L 2200/10* (2013.01);
(Continued)

(58) Field of Classification Search
CPC ......... B64U 50/30; B64U 50/19; B60L 50/60; B60L 50/90; B60L 2200/10; B60L 1/003; B60L 7/10; B60L 8/006; B64D 27/24; B64D 27/026; F01D 15/10; H02J 7/0049; H02J 7/0063; H02J 7/00712; H02J 2207/20; H02J 7/14; H02P 9/006; H02P 2103/20; H02P 29/024; Y02T 10/70; Y02T 10/7072
USPC .................................................. 318/139, 140
See application file for complete search history.

(56) References Cited

U.S. PATENT DOCUMENTS 5,881,559 A * 3/1999 Kawamura .............. B60K 6/24
903/905
7,958,727 B2 * 6/2011 Arnold .................... B60L 50/40
60/605.1
(Continued)

*Primary Examiner* — David Luo
(74) *Attorney, Agent, or Firm* — Greenberg Traurig, LLP

(57) ABSTRACT

Systems and methods involving dynamic recharge features and functionality for electric vehicles and other applications are disclosed. In one example, an illustrative electro-mechanical power system may comprise an electric vehicle (EV) motor that drives a shaft, an EV battery module coupled to the EV motor, and a dynamic recharge system coupled to the EV battery module, wherein the DRS includes an ambient air intake, a turbo coupled to the air intake and configured to create power that is used to charge the EV battery module, and a generator assembly. Further, the generator assembly may include a generator and a generator control module, wherein the generator includes a rotor coupled to the turbo, and the generator control module includes control electronics that manage and provide the electrical energy as an output to the EV battery module and/or the EV motor. Other embodiments for differing applications are also disclosed.

20 Claims, 14 Drawing Sheets

Related U.S. Application Data

(60) Provisional application No. 63/237,955, filed on Aug. 27, 2021.

(51) Int. Cl.
| | |
|---|---|
| *B64U 50/19* | (2023.01) |
| *F01D 15/10* | (2006.01) |
| *H02J 7/00* | (2006.01) |
| *H02P 9/00* | (2006.01) |
| *H02P 103/20* | (2016.01) |

(52) U.S. Cl.
CPC ......... *B64D 27/026* (2024.01); *H02J 2207/20* (2020.01); *H02P 2103/20* (2015.01)

(56) References Cited

U.S. PATENT DOCUMENTS 10,230,321 B1 * 3/2019 Papini .................. H02P 29/032
10,985,682 B2 * 4/2021 Kakosimos ............ H02P 21/50

\* cited by examiner

SYSTEMS AND METHODS INVOLVING DYNAMIC RECHARGE FEATURES AND FUNCTIONALITY FOR ELECTRIC VEHICLES, ELECTRIC HOMES AND/OR OTHER IMPLEMENTATIONS

CROSS-REFERENCE TO RELATED APPLICATION(S) INFORMATION

This application is a continuation (bypass) of International application No. PCT/US22/41945, filed Aug. 29, 2022, published as WO2023/028381A1, which claims priority/benefit of U.S. provisional patent application No. 63/237,955, filed Aug. 27, 2021, all of which are incorporated herein by reference in entirety.

BACKGROUND

In order for electric vehicle (EV) manufacturers to advance battery-electric technology, substantial investments in research and development of new technologies will be required or existing technology will have to be used in innovative ways. Long-range electric vehicles are priced at a premium and suffer from limited range, making them far less appealing than traditional internal combustion engine (ICE) vehicles. EV federal government subsidies are limited to the first 200,000 units sold by each manufacturer and will soon, if not already, be eliminated. Furthermore, EV fast charging stations are not readily available throughout the country like gasoline and diesel refueling stations are for traditional internal combustion engine vehicles. Moreover, in both electric vehicle and other electric charging/recharging implementations such as electric homes, various drawbacks and inefficiencies exist with respect to capabilities of existing electric power systems to maintain battery charge for extended durations. Aspects of the innovations herein are directed to addressing these and other related drawbacks.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION OF CERTAIN ILLUSTRATIVE IMPLEMENTATIONS

Various detailed embodiments of the present disclosure, taken in conjunction with the accompanying figures, are disclosed herein. However, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

According to embodiments herein, aspects of the disclosed technology may comprise or involve a dynamic recharge system (DRS) including a generator charging system, which may be utilized, inter alia, for providing recharge capacity to electric vehicle (EV) battery modules, e.g., configured for and capable of delivering direct power to EV motors and other auxiliary loads when the battery is fully charged. In some embodiments, the disclosed technology may also or exclusively be configured and utilized to provide an additional means of battery and/or brake rotor cooling, for example, via the air cooler exhaust. See, e.g., the air cooler 140 and the exhaust to brakes/battery at 116, as shown and described in connection with FIG. 1, below. In certain implementations described below, the disclosed technology may comprise two (or more) components, such as an ambient air intake component and a turbo-generator charging component, which may be configured for integration into the electric vehicle's existing cooling management and charging systems, as set forth below.

Figure 1:
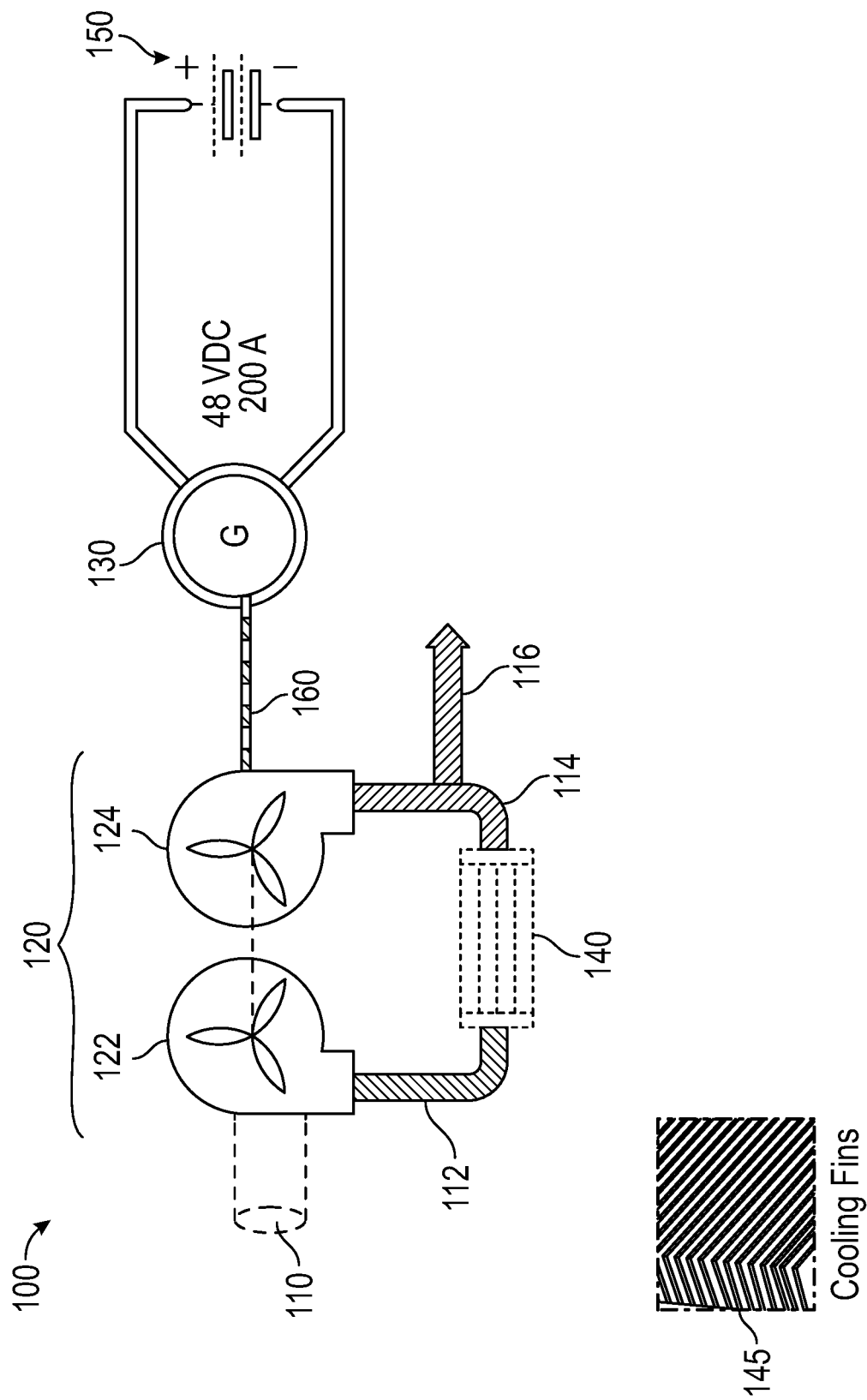
FIG. 1 is a block diagram illustrating aspects of an exemplary dynamic recharge system, consistent with exemplary aspects of certain embodiments of the disclosed technology.

FIG. 1 is a block diagram illustrating aspects of an exemplary dynamic recharge system 100, consistent with exemplary aspects of certain embodiments of the disclosed technology. Referring to FIG. 1, an exemplary dynamic recharge system may include air tubing 110, 112, 114, at least one turbo assembly 120 and at least one generator 130. According to implementations herein, the disclosed technology shown in FIG. 1 may be configured to mechanically inducing an electric current via innovative utilization, configuration and/or other aspects of the internal combustion engine automotive components set forth herein. In some embodiments, for example, the disclosed technology may utilize components of an internal combustion engine turbo charger and alternator, directly coupled together to form a generator, via a linkage, such as a mechanical, electromechanical, etc., linkage, e.g., including a shaft and/or housing. In contrast, e.g., in a traditional internal combustion engine setup, the alternator rotor shaft is connected to an alternator belt that spins the rotor shaft, thereby generating the relative motion between the rotor and stator. As such, in salient comparison, a typical internal combustion engine turbo charger shaft rotates at speeds of 150,000 revolutions per minute (rpm) or more, while implementations of the disclosed technology may only require operation at speeds of approximately 2000 to 7500 rpm to achieve the technical solutions herein. In some embodiments, the speed requirements of the disclosed technology are no more than five percent the maximum speed needed for a traditional turbo to develop the required voltage output. As such, and further to such rotational/speed improvements, various implementations herein generate far less heat and requiring fewer cooling and lubrication components, thereby overcoming drawbacks of existing systems.

According to embodiments herein, in order to mechanically induce an electric current, a current-carrying conductor (e.g., generator stator windings, etc.) may be located in a magnetic field (e.g., that of generator rotor, etc.), with relative motion between the two. In some implementations, such stator may be a nest of wires or windings (e.g., copper wires, etc.) that convert a rotating magnetic field into electrical energy. In such implementations, the rotor may be a moving component of an associated electromagnetic system, such as one that is effectively made up of a group of magnets.

In the illustrative system shown in FIG. 1, ambient air travels through air tubing 110 and is drawn into the turbo assembly 120. In some embodiments, the turbo assembly 120 may comprise a compressor body, a compressor wheel, a turbine body, and a turbine wheel. In operation, as air flows into the compressor 122 end of the turbo assembly 120, the airflow subsequently causes the compressor wheel 310 (shown in FIG. 3) to spin. This rotation of the compressor wheel 310 provides the initial mode of force that causes the rotor shaft/linkage 160 between the turbo compressor 122 and the turbo turbine wheel 330 (also 120, in FIG. 1) to move. Air then travels through the compressor body 320 (FIG. 3) and to the air cooler 140 via air tubing 112.

Figure 2:
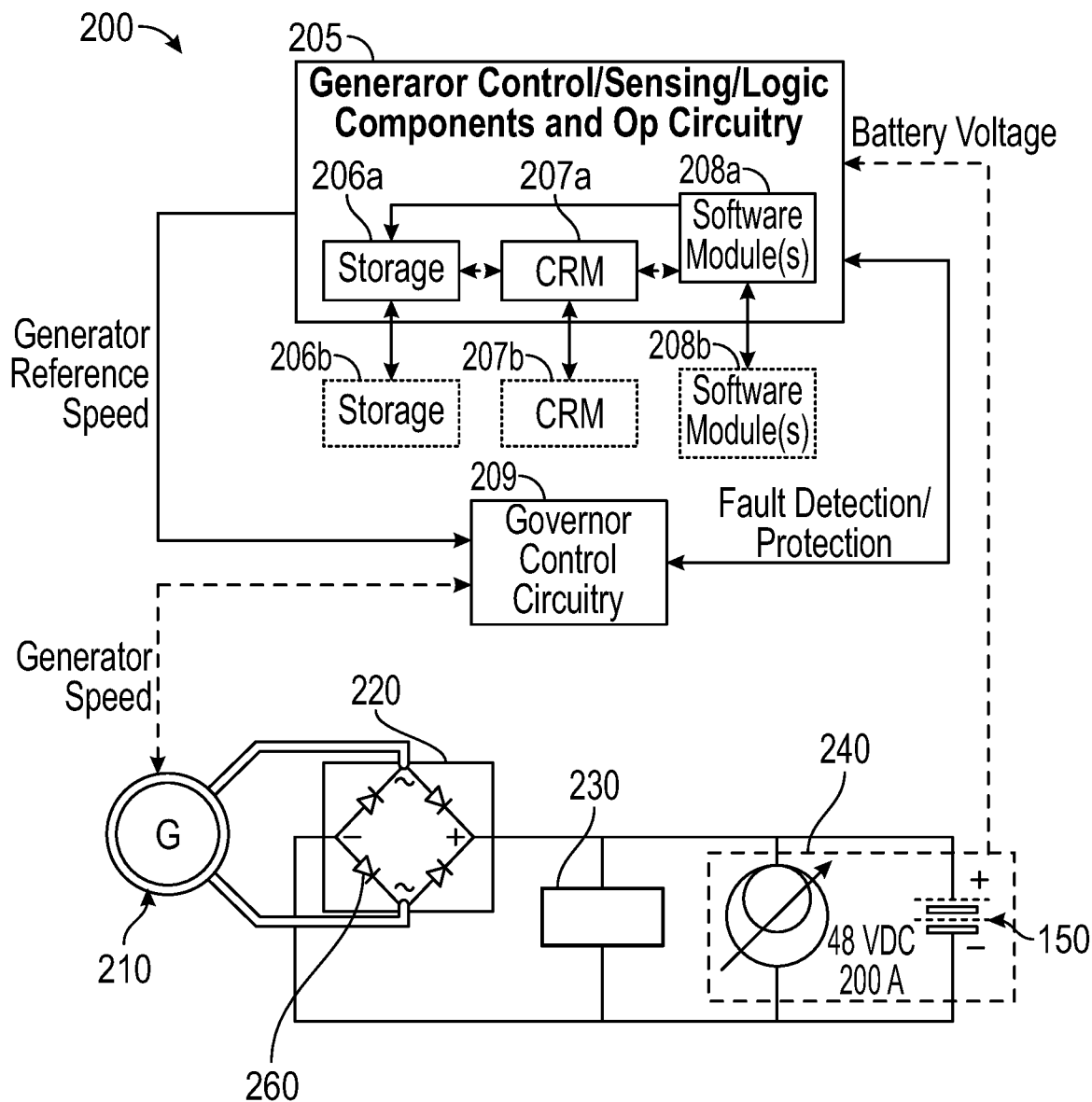
FIG. 2 is an illustrative schematic diagram illustrating aspects of an exemplary dynamic recharge system, consistent with exemplary aspects of certain embodiments of the disclosed technology.

FIG. 2 is an illustrative schematic diagram illustrating aspects of an exemplary dynamic recharge system, consistent with exemplary aspects of certain embodiments of the disclosed technology. Referring to FIG. 2, one illustrative circuit diagram is shown consistent with the disclosed technology, including a generator 210, control/sensing circuitry 205, a rectifier 220, signal smoothing, suppression and/or control circuitry 230, and/or regulation circuitry 240, coupled to the electric vehicle battery 150. According to embodiments herein, the rectifier may comprise and/or involve a bridge rectifier, e.g., including one or more diodes 260. In some implementations, the signal smoothing, suppression and/or control circuitry 230 may include a smoothing capacitor, for example. Additionally, the generator control/sensing circuitry 205 may include various electronic components and house the software necessary for system operations. Further, in some embodiments, the regulation circuitry may comprise a voltage regulator, current regular, or other such known regulation circuitry utilized to provide a regulated charge to the electric vehicle battery 150 suitable for charging thereof.

According to embodiments of the disclosed technology consistent with the exemplary electrical circuit diagram of FIG. 2, the generator 210 initially produces a bidirectional alternating voltage/current, such as an alternating current (AC) signal, that must be rectified and converted to direct voltage or direct current (DC) signal. In implementations where such AC-to-DC conversion is utilized, the converted DC current is necessary in order to achieve compatibility with the EV electrical distribution and charging system, e.g., to charge the electric vehicle battery 150. In such AC/DC conversion embodiments, the AC voltage may be rectified and converted to a unidirectional DC voltage via a rectifier 220, such as a bridge rectifier. In such bridge rectifier (or other diode-containing rectifier) embodiments, the diodes 260 may be configured and coupled in a bridge rectifier arrangement, as shown in FIG. 2, e.g., in two pairs. Here, for example, one pair of diodes are switched on to conduct during the positive cycle of the AC signal and the other pair of diodes are switched on during the negative cycle of the AC signal. According to implementations herein, this or other such rectifier circuitry consistent with the disclosed technology, results in a constant DC voltage at the generator output.

According to various embodiments of the disclosed technology, signal smoothing, suppression and/or control circuitry 230, or similar circuitry, may, optionally, be included to reduce voltage and/or current variations and/or otherwise filter or smooth the signal(s) being output from the generator 210. In some illustrative implementations, for example, the signal smoothing, suppression and/or control circuitry 230 may include a smoothing capacitor, e.g., to improve the average DC voltage output of the rectifier 220, and/or while reducing the AC voltage variation by filtering the output waveform of the generator 210. In such embodiments, for example, the signal smoothing, suppression and/or control circuitry 230, such as the smoothing capacitor, may connected in parallel with the battery 150 across the output of the rectifier 220, which may aid in increasing the average DC voltage output to an even higher or more improved level, e.g., due to the smoothing capacitor's electrical behavior as a storage device.

Consistent with certain implementations herein, the regulation circuitry 240 may be configured to monitor the output signal (e.g., voltage, current, power, etc.) of the generator 210 to ensure it is maintained within acceptable limits. Further, here, the output (e.g., the DC voltage output in AC-to-DC conversion implementations), may be then be regulated and maintained within the tolerances of the desired level (e.g., 48 VDC in the representative example illustrated in FIG. 2) via the regulation circuitry 240, e.g., prior to charging the electric vehicle battery 150. Otherwise, variations in the output signal of the generator 210 (e.g., the raw current at the output, etc.) have the potential to produce an over-voltage condition and/or other damage signal components in the EV electrical distribution and charging system.

According to embodiments of the disclosed technology consistent with the exemplary electrical circuit diagram of FIG. 2, the generator control/sensing & logic circuitry 205 monitors rotor shaft 160 speed and compares generator 210 output voltage and a predetermined battery 150 voltage state stored in the logic of the generator control circuitry 205. In some embodiments, when the generator control circuitry 205 senses that the battery 105 state is below the predetermined threshold, the generator control circuitry 205 may be configured to energize/power the generator 210, if idle, or increase rotor shaft 160 speed in order to reduce the load on the EV battery 150. Such embodiments may be particularly useful under certain load conditions, such as during city driving, when average speeds are much lower than highway driving, and also less likely to provide an overall net positive charge state from the output of the generator 210 for the EV battery 150. Furthermore, such embodiments may be manually engaged by the user in an emergency or low charge mode. Here, for example, such manual engagement of the emergency or low charge mode may be implemented to assist in raising the battery 150 charge state above a predetermined, critically low, battery voltage threshold stored in the generator control circuitry logic when an EV charging station is not available.

Turning back to FIG. 1, innovations of the disclosed technology involve airflow via air flow channels such as air tubing, 110, 112, 114, and 116, ad/or air cooler 140. In some embodiments, the existing air cooler 140 may bear resemblance to a radiator (e.g., of an internal combustion engine) and its functionality may bear relation to that of a turbo or supercharger intercooler. In general, according to implementations herein, there are generally two types of air coolers in electric vehicles, air-cooled and water-cooled. As set forth herein, the disclosed technology is capable of being integrated into and/or mated to either type.

With regard to electric vehicles that utilize air-to-air type air coolers, for example, the disclosed technology may be integrated such that air travels through one or both of the inside and/or the outside of the air cooler. In operation, heat may be extracted from the air from the compressor exhaust, as shown and described in more detail in connection with FIG. 3, via passing the air through a network of tubes with cooling fins. As the compressed air is pushed through the air cooler 140, it transfers the heat to the tubes and, e.g., in turn, in some embodiments to one or more air cooling structures or devices, such as cooling fins 145, or other such heat-transfer or heat sink structures or devices known in the art. The cool air from outside the electric vehicle, traveling at speed and, in some embodiments, assisted by a cooling fan, absorbs the heat from the cooling fins 145, thereby reducing the temperature of the compressed air. Further, here with such air-cooling implementations, the disclosed air-to-air designs provide systems having one or both of a lower cost and/or less weight. In contrast to such benefits, such air-to-air designs may be more susceptible to heat soak, and/or to overheating, due to variations in specific environments, such as air temperature.

Figure 3:
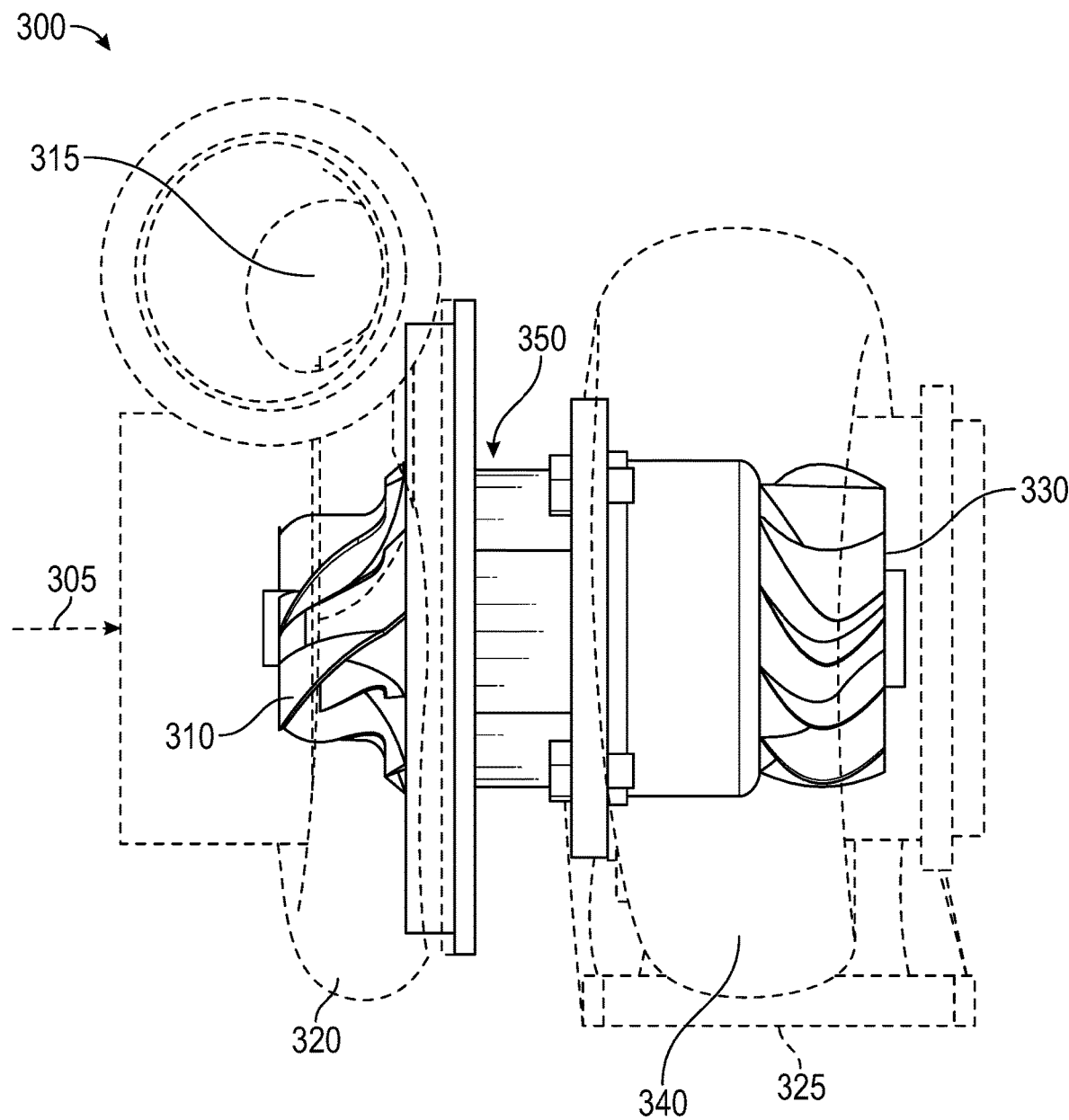
FIG. 3 is diagram illustrating portions of an exemplary dynamic recharge system, consistent with exemplary aspects of certain embodiments of the disclosed technology.

With regard to electric vehicles that utilize air-to-water type air coolers, water and/or comparable liquid media may be utilized as the heat transfer agent. Heat is extracted from the air at the compressor exhaust, as shown in FIG. 3, by passing it over a network of tubes with water (or other fluid) circulated through them. Such fluid is then pumped through another cooling circuit, a radiator, while cool compressed air is pushed into the turbine intake, as shown in FIG. 3. Air-to-water type air coolers tend to be smaller than air-to-air type air coolers, making them more suitable for difficult installations where space, air flow and/or intake length/area/spacing may be issue(s). Additionally, in certain implementations, water and/or other fluids are a more efficient and/or more stable heat-transfer agent than air; therefore, they are able to handle larger variations in air temperature and less susceptible to heat soak. However, in certain implementations, air-to-water type air coolers may raise other issues, such as adding more weight, complexity and/or cost due to the addition of a radiator, pump and water transfer lines.

Upon completion of the air cooling via either technique, the cool air then exits the air cooler 140 and is pushed to the turbine 124 (e.g., the turbine body 340 of FIG. 3), via air tubing 114. Further, here, such cooled air may subsequently assist the turbine wheel 330 (FIG. 3) and/or the rotor in maintaining and/or increasing one or both their speed. Additionally, according to embodiments herein, the speed at which the rotor shaft 160 rotates is directly proportional to the road speed of the EV while operating.

FIG. 3 is diagram illustrating aspects of an exemplary dynamic recharge system, namely an exemplary compressor-turbine assembly 300, consistent with exemplary aspects of certain embodiments of the disclosed technology. In the embodiment shown in FIG. 3, the exemplary compressor-turbine assembly 300 may include a compressor wheel 310, compressor body 320, a turbine wheel 330, and a turbine body 340.

Referring to FIG. 3, in some embodiments, airflow in/at the ambient air intake 305, as illustrated, is directly proportional to vehicle speed. As vehicle speed increases, airflow to the compressor wheel increases, thereby rotating/spinning the combined turbo/rotor shaft faster. Further, according to embodiments herein, the generator 130, 210 is coupled to the turbine wheel 330 via a rotor shaft 160 (e.g., mechanically coupled via a linkage shaft, etc.) and airflow from the air cooler exhaust is directed to the turbine wheel to maintain or increase its speed. As shaft speed increases, a desired voltage/current/power (e.g., a 48-volt, direct current (DC) voltage in the illustrated embodiment) may be produced at the output of the generator 210. Such produced output voltage/current/power may be utilized to one or both of charge the battery and/or provide instantaneous power for the electric motor(s), such as if the battery is at full charge, power is desired via such means over the battery, etc. Further, according to the disclosed technology, the turbine wheel 330 may subsequently draw cool air into the turbine side of the turbo generator charger and the lower temperature, lower pressure air cooler exhaust may also then be directed to the battery cooling system or brake rotors for added cooling, e.g., as shown at 116 in FIG. 1.

Figure 4:
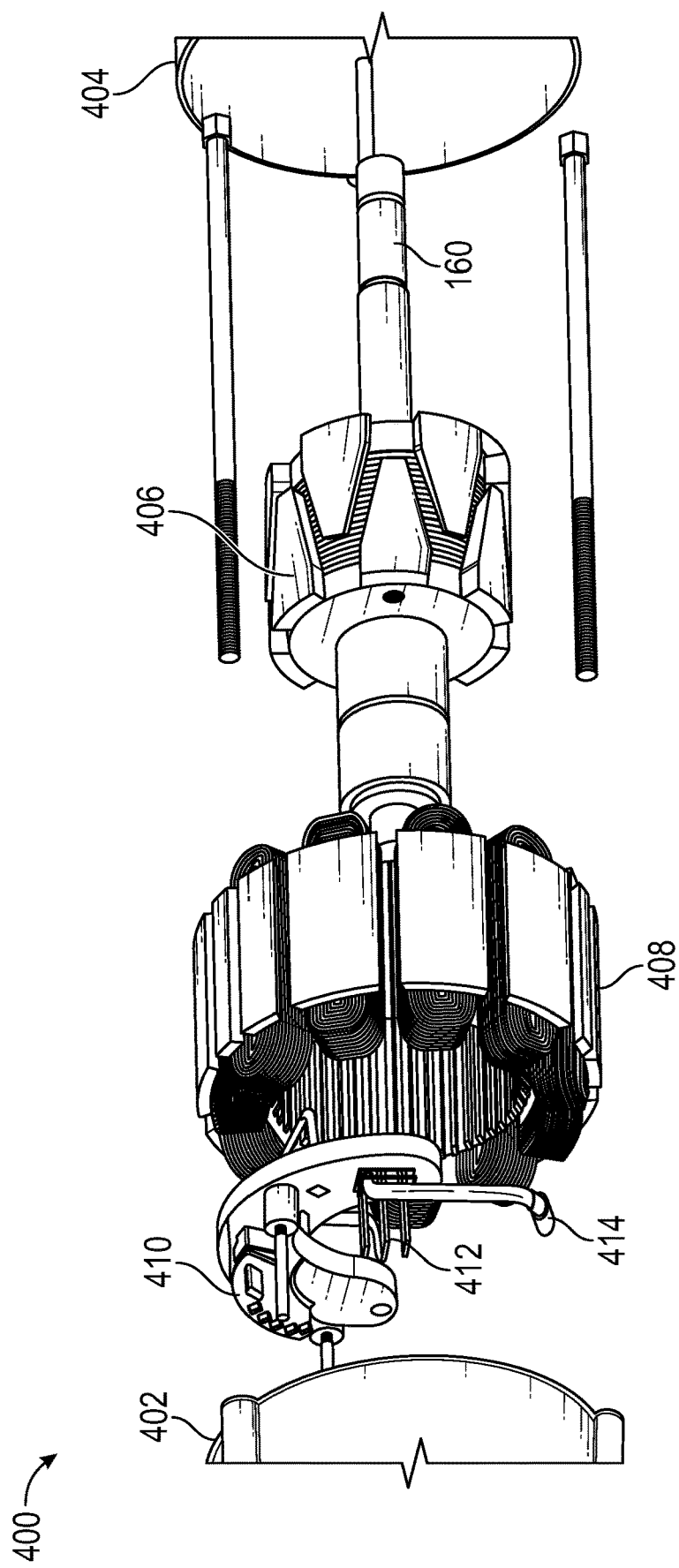
FIG. 4 is a system diagram of an illustrative generator assembly involving an exemplary dynamic recharge system, consistent with exemplary aspects of certain embodiments of the disclosed technology.

FIG. 4 is a system diagram of an illustrative generator assembly 400 involving an exemplary dynamic recharge system, consistent with exemplary aspects of certain embodiments of the disclosed technology. Referring to the embodiment of FIG. 4, the exemplary generator assembly 400 of FIG. 4 may include a compressor body housing 402, a turbine body housing 404, rectification component(s) 410, a rotor 406, a stator 408, a rotor shaft 160, smoothing/ suppression component(s)/circuitry 414, and/or regulation component(s)/circuitry 412. According to aspects of the dynamic recharge systems herein, in some embodiments, the generator housing 350 of FIG. 3 may reside in the space between the turbo compressor (e.g., compressor wheel 310, compressor body 320, etc.) and the turbine body 340, such as within the generator housing 350. In some embodiments, the rotor 406 and stator 408 may also reside within the generator housing 350, and the rectification component(s) 410 and regulation component/circuitry 412 may reside within or on the turbo-generator assembly 300. Consistent with aspects of the disclosed technology, as the linkage 160 (FIG. 1) between the turbine wheel 330 (FIG. 3) and the generator assembly 400 (FIG. 4) rotates, it induces a signal such as a voltage at the output of the generator 210, as shown in FIG. 2. According to embodiments herein, such signal or voltage is mechanically induced by spinning the generator rotor 406, as shown in FIG. 4, which in turn creates electricity in the stator 404 via the process of electromagnetism, the interaction of electric currents in magnetic fields.

As such, according to embodiments of the disclosed technology herein, as the electric vehicle speed increases, the voltage output increases until the generator output signal (e.g., voltage, etc.) reaches its maximum sustained voltage (e.g., 48 VDC, in the one illustrative implementation shown in FIG. 2). Here, in these illustrative embodiments, it is noted that a voltage output of 48 VDC was chosen for the examples of the disclosed technology set forth herein, due to most electric vehicle battery charging and electrical distribution systems currently operating at such voltage level. However, other desired voltage, current and/or power output levels may readily be provided via the disclosed technology, e.g., to meet the needs of various EV electrical distribution and charging system, e.g., by utilizing electrical/circuitry variations known to those of skill in the art.

Turning back to FIG. 2, various feedback and/or control components and/or circuitry may also be utilized and/or involved in the disclosed technology, some of which are illustrated in the exemplary embodiment of FIG. 2. Referring to FIG. 2, for example, governor control circuitry 209 may be included or utilized to regulate and maintain desired operating parameters, such as a constant rotational speed of the generator rotor 160 in response to changing charge state of the EV battery 150. According to embodiments herein, such governor control circuitry 209 may receive its operating parameters such as speed setpoint from computer readable media 207, which is associated with (and may be be inside 207a or external 207b to) generator control/sensing/logic components and/or circuitry 205, and, in some embodiments, a software module 208 (also one or both of inside 208a and/or outside 208b of 205) may be configured to compare the relevant values and parameters, such as generator reference speed to current generator speed. Consistent with the disclosed technology, the generator control/sensing/logic components and/or circuitry 205 may be configured for raising and lowering generator speed via the governor control circuitry 209 whenever a generator reference speed is reached, which, for example, may be predetermined by software 208. According to certain embodiments, the generator reference speed setpoints may be stored (permanently or otherwise) in storage 206, which may also be located within (206a) and/or external (206b) to the generator control/sensing/logic components and/or circuitry 205. Additionally, in some implementations, the governor control circuitry 209 may provide a protective feature for the generator by sending and receiving generator and electrical system parametric data between the generator and generator control/sensing/logic components and/or circuitry 205. Further, in accordance with certain aspects of the disclosed technology, whenever a fault (e.g., system over voltage, generator overspeed, generator speed not within tolerance of generator reference speed, etc.) is detected by the generator control/sensing/logic components and/or circuitry 205, control and/or functionality may be implemented such that the generator 210 can be derated and/or deenergized via a signal to the governor control circuitry 209 from the software module 208 to prevent damaging the dynamic recharge system.

Figure 5:
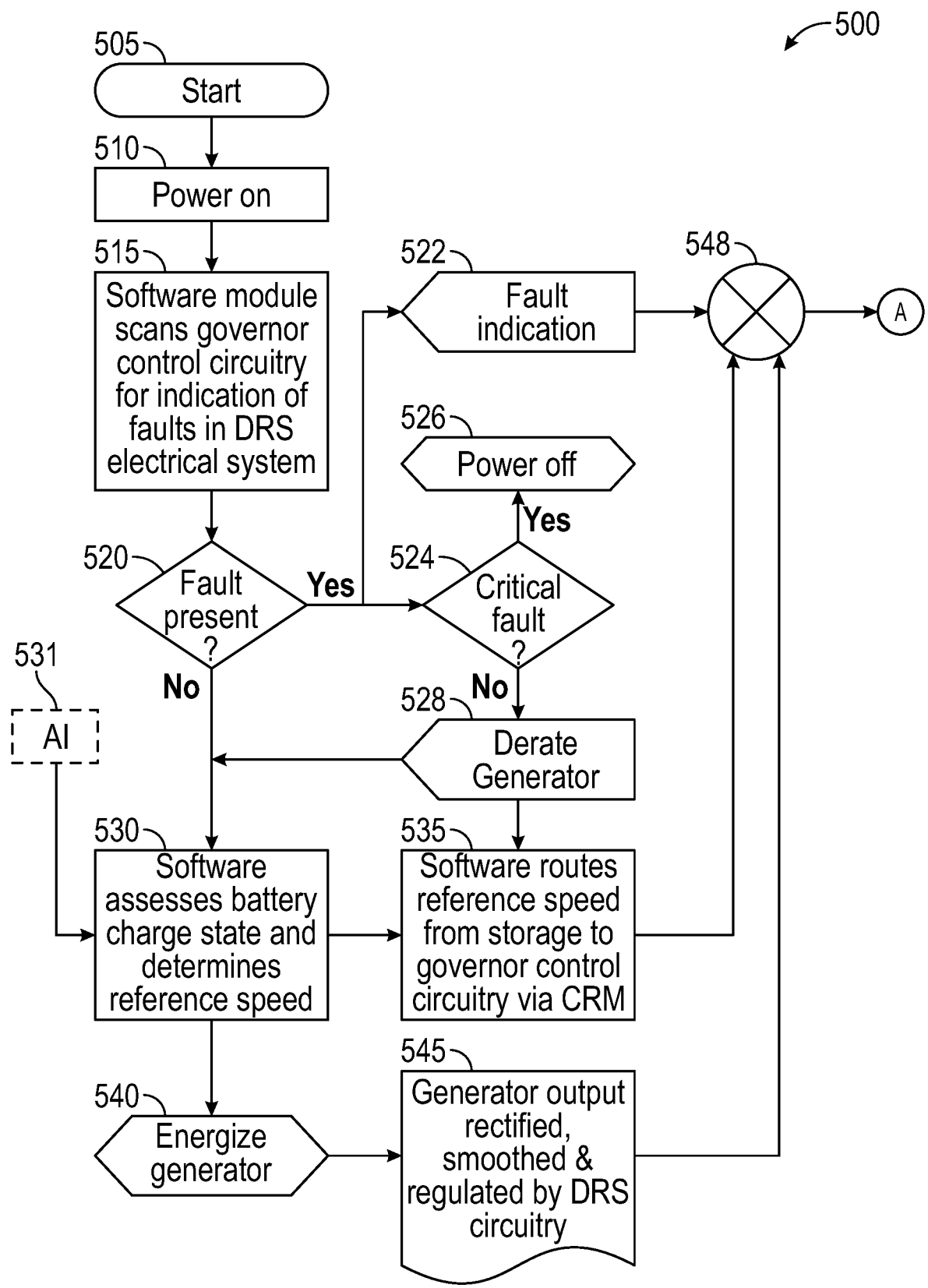
FIG. 5 is a flowchart illustrating representative aspects and functionality regarding operation of an exemplary dynamic recharge system, consistent with exemplary aspects of certain embodiments of the disclosed technology.
Figure 5:
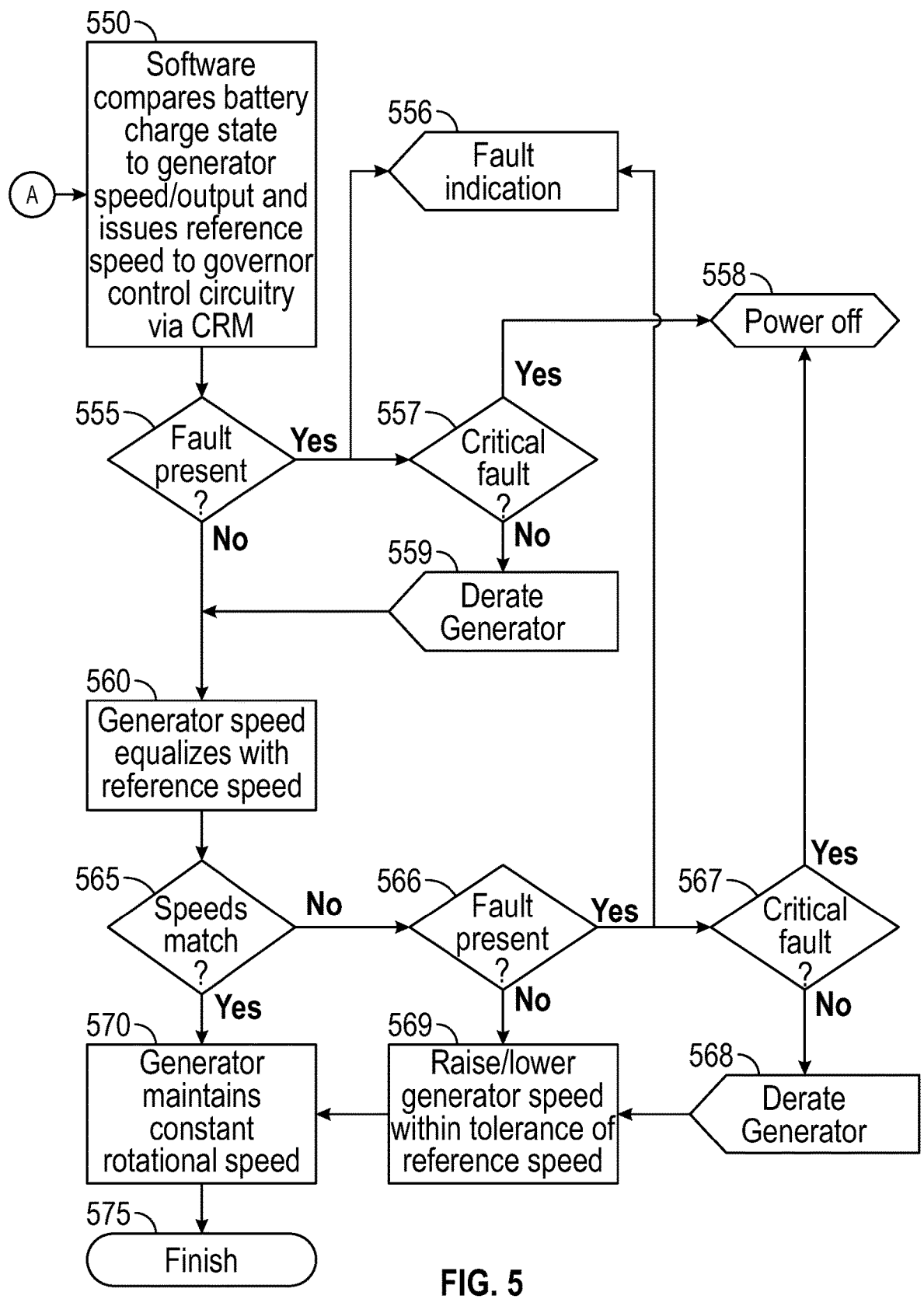

FIG. 5 is a flowchart illustrating representative aspects and functionality regarding operation of an exemplary dynamic recharge system, consistent with exemplary aspects of certain embodiments of the disclosed technology. Referring to the exemplary flowchart illustrated in FIG. 5, an exemplary dynamic recharge process 500 begins, at 505, and operations commence with a power on, at 510. In the illustrative implementation shown in FIG. 5, once powered on, the software module(s) 208 may scan the governor control circuitry for indication of faults in the DRS electrical system, at 515. If a fault is present, at 520, the process may next determine if the fault is critical, at 524, and, if so, power off, at 526. If a fault is detected to be present, at 520, the process may also determine and/or indicate the nature of the fault, at 522, and then provide that as an input to later downstream processing, e.g., as shown by way of illustration and not limitation at 548, as described below. If the fault is deemed not to be critical, at 524, the process may proceed to derate the generator, at 528, and proceed with processing as if no fault was determined to be present, at 520.

In the exemplary embodiment illustrated, if no fault is present at 520 or once the generator has been derated at 528, the process flow may proceed, at 530, with the software 208 assessing battery charge state and determining a reference speed. Further, it is noted here at step 530, that such software assessment may be implemented utilizing artificial intelligence (AI) processing and inputs, shown at 531 in FIG. 5. Here, for example, various exemplary dynamic recharge systems herein may utilize or involve software embedded with AI to optimize speed and voltage output, e.g., by adjusting output voltage gain. According to such embodiments, various AI implementations may utilize baseline voltage and speed data to create the most efficient battery charge state, thereby increasing charge, vehicle range, and related improvements, in corresponding embodiments.

Once the reference speed has been determined at 530, the process (such as via software 208, etc.) may proceed, at 535, to route the reference speed from storage 206 to the governor control circuitry, such as by processing instructions and/or providing information via the computer readable media 207. Such reference speed information may then also be provided as input for downstream processing, e.g., at 548. After the reference speed has been determined, at 530, the generator may be energized, at 540, and the process proceeds to having the generator output rectified, smoothed and/or regulated via the dynamic recharge system circuitry or components, at 545. This adjusted output is then also provided as an input for later downstream processing, at 548.

With one or more of the noted inputs provided or available, at 548, the illustrative process of FIG. 5 may then proceed, at 550, with comparing (e.g., via the software 208, etc.) the battery charge state to the generator parameters such as speed, output, etc. and then issue a reference speed to govern the control circuitry (e.g., via the computer readable media 207). If a fault is determined to be present, at 555, the processing may proceed to a determination whether or not the fault is critical, at 557, and then to powering off the system, if so, at 558. In parallel, if a fault is determined to be present at 555, the process may determine and provide an indication of the fault to the system, at 556. If the fault is determined to not be critical, at 557, the process may proceed with derating the generator, at 559, as well as, thereafter, performing processing consistent with when no fault was found, back at step 555. If no fault was determined to be present, at 555, or if the fault was deemed not critical and the generator derated, at 559, the process may proceed with controlling the generator speed until it is equalized with the reference speed, at 560.

In some embodiments, as part of the process ensuing after step 560, the system may initially make a determination as to whether or not the speeds match, at 565. If the speeds do match, the process proceeds with the generator maintaining a constant rotational speed, at 570, which may include, in some embodiments, further iterations of such feedback loops to maintain such speed. With the speed thusly maintained, the process may finish, at 575. If, at step 565, the speeds are determined not to match, an ensuing step to determine whether a fault is present may be performed, at 566. If no fault is present at step 566, the process may proceed to raise or lower the generator speed within/to tolerance of the reference speed, at 569. Once the generator speed is brought to within such tolerance, the process may proceed to the step of maintaining constant rotational speed, at 570, and finishing the process, at 575. If a fault is determined to be present at 566, the process may then proceed, in one regard, to determine whether or not the fault is critical, at 567. If the fault is determined to be critical, at 567, the system or process will power off, at 558. If the fault is determined to not be critical, at 567, the process may proceed to derate the generator, at 568, and then proceed through the generator speed adjustment 569 and speed maintenance 570 steps, before finishing the process, at 575. If a fault is determined to be present, at 566, the process may also proceed, in another regard, to the step of determining and/or providing an indication of the fault to the system, at 556.

Consistent with the above features, functionality, and associated innovations, electric vehicle and electric car embodiment herein may take advantage of the vehicle's motion as it travels along its path. Further, in some embodiments, higher pressure and turbulent frontal airflow into the EV air intake may provide the force that drives the compressor blades, thereby spinning the turbo shaft. Here, for example, such airflow passes through the turbo/assembly 120, 300, and the air supplies additional energy to turn the turbine blades and the torque to spin the generator rotor. As the generator rotor spins, the DRS control electronics monitors the DC voltage output to efficiently charge the EV battery and supply power to other loads onboard the electric vehicle. Finally, according to various embodiments herein, such dynamic recharge systems can function both with a pure electric vehicle and/or in a hybrid application, e.g., alongside an internal combustion engine to extend the range of the hybrid vehicle when in battery-only mode.

Figure 6:
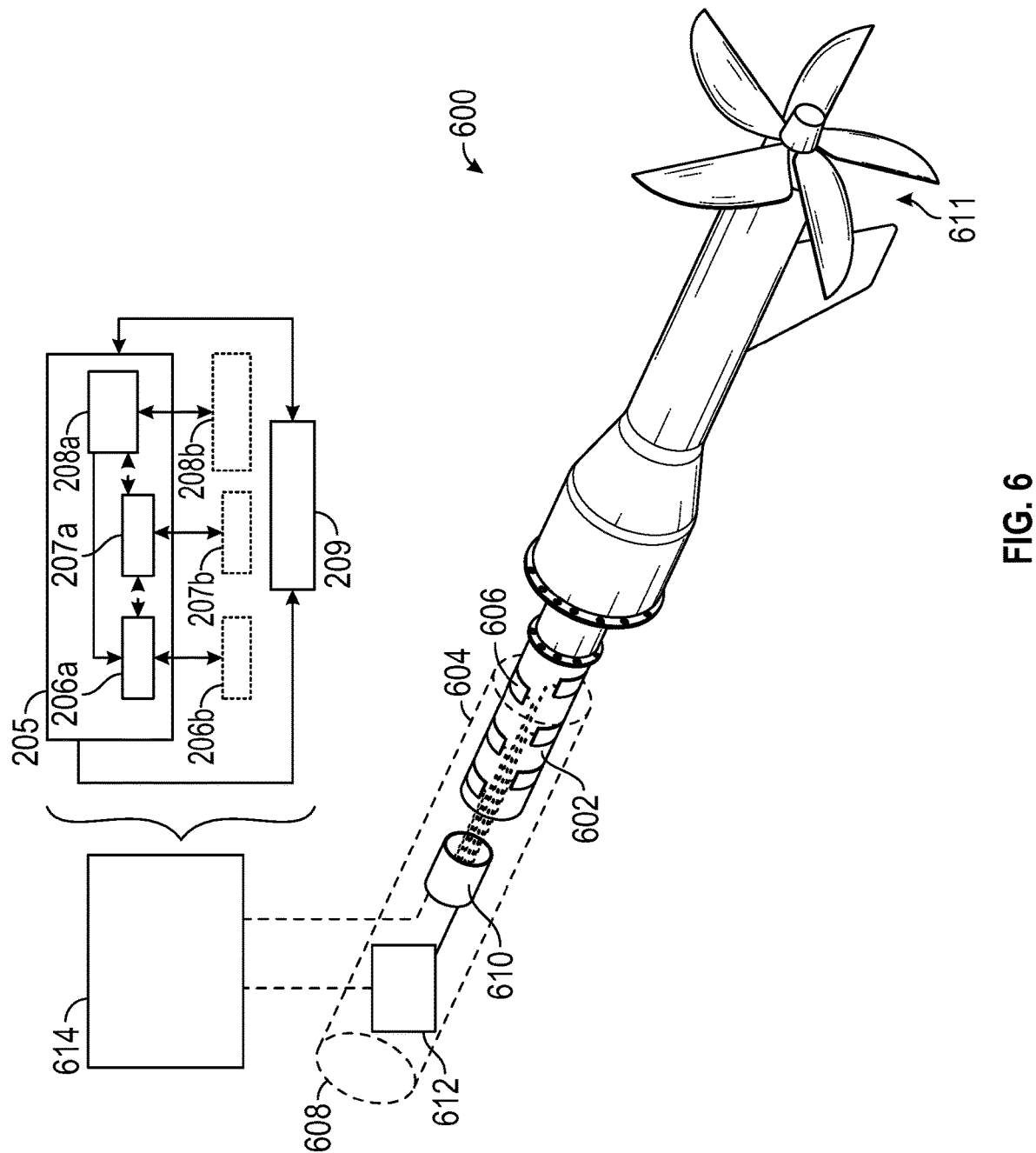
FIG. 6 is a diagram illustrating aspects of an exemplary dynamic recharge system pertaining to embodiments that involve boat-related and other propellor shaft containing implementations, consistent with exemplary aspects of certain embodiments of the disclosed technology.

FIG. 6 is a diagram illustrating aspects of an exemplary dynamic recharge system pertaining to embodiments that involve boat-related and other propellor shaft containing implementations, consistent with exemplary aspects of certain embodiments of the disclosed technology. FIG. 6 illustrates an exemplary boat drive system 600, including a propellor 611, a propellor shaft 602, propellor magnets 606, propellor shaft casing 608, a generator 610 (which may also be positioned around the propellor shaft, e.g. at 604, and DRS control electronics 612, 614, such as generator control modules and/or control electronics. Further, as also shown in FIG. 6, embodiments herein may include and/or involve one or more components, features or aspects of control/sensing circuitry 205 and associated electronics, as shown and described in connection with FIG. 2, above. Such boat implementations may also include a fluid intake and turbine, such as the air intake and turbine of FIGS. 1-4, though these may be implemented using one or both of an air and/or fluid (i.e., water) intake in the boat embodiment.

Consistent with systems and methods of the disclosed technology, electric boat embodiments herein may be configured to take advantage of the vehicle's motion as it travels along its path. In embodiments with air turbo devices, higher pressure and turbulent frontal airflow coupled with laminar airflow into the EV intake provide the force that drives the compressor blades, thereby spinning the turbo shaft. As with the electric vehicle embodiments, such airflow passes through the turbo, and the air supplies additional energy to turn the turbine blades and the torque to spin the generator rotor. As the generator rotor spins, the DRS control electronics monitors the DC voltage output to efficiently charge the EV battery and supply power to other loads onboard the EV. As with the electric (land) vehicle embodiments, dynamic recharge systems here may be configured to function with a pure marine/boat electric vehicle or in a hybrid application alongside an internal combustion engine to extend the range of the hybrid vehicle when operated in tandem with the ICE.

The DRS can operate in a stand-alone mode, capitalizing on the rotational motion of the propeller shaft with magnetic elements to produce DC voltage via a transverse flux generator mounted around the propeller shaft. This application reduces a traditional marine diesel setup's footprint, weight, and cost. Furthermore, the DRS stand-alone setup eliminates the need for carrying diesel fuel onboard, reducing the fire hazard and providing more design flexibility for holding tank and living space capacity.

Turning to exemplary use cases of such boat embodiments, airflow into the ambient air intake or water flow into a water intake, is directly proportional to vehicle speed. As vehicle speed increases, airflow, or water flow to the turbine/compressor wheel increases, thereby spinning the turbo shaft faster. Further, the alternator-generator is mechanically coupled to the turbine wheel via a linkage shaft, and airflow from the air-cooler exhaust or water flow is directed to the turbine wheel to maintain or increase its speed. As shaft speed increases, the desired voltage is produced at the output of the AG. Such output can either be used to charge the battery or as instantaneous power for the electric motor(s) if the boat battery is at full charge. Further, in some embodiments, the turbine wheel then draws cool air into the turbine side of the turbocharger, and the lower temperature, lower pressure air cooler exhaust can be directed to the battery cooling system or engine compartment for added cooling.

According to embodiments herein, a boat dynamic recharge system, such as shown in FIG. 6, can mechanically induce an electric current by using standard, commercial off-the-shelf marine diesel components. Specifically, according to certain example embodiments, the dynamic recharge system may utilize a marine diesel turbocharger directly coupled to an internal combustion engine alternator via a mechanical linkage. In contrast, for a traditional marine diesel setup, there are separate diesel generators for propulsion and supplying electrical load to the rest of the boat. The DRS can perform both duties.

Further, in some embodiments, certain boat dynamic recharge systems herein may use an air-to-water type air cooler, water is the heat transfer agent. Heat is extracted from the air at the compressor exhaust, by passing it over a network of tubes with water circulated through them. Then, the water is pumped through another cooling circuit, a radiator, while cool compressed air is pushed into the turbine intake. Air-to-water type air coolers tend to be smaller than air-to-air type air coolers, making them more suitable for difficult installations where space, airflow, and intake length are an issue, such as boat embodiments herein. Additionally, water is a more efficient and stable heat transfer agent than air; therefore, water can manage larger variations in air temperature and is less susceptible to heat soak. However, air-to-water type air coolers add more weight, complexity, and cost due to the addition of a radiator, pump, and water transfer lines.

In operation (of an exemplary air powered system), cool air then exits the air cooler 140 and flows to the turbine body, via air tubing 114, then aids the turbine wheel in maintaining and/or increasing its speed. The speed at which the mechanical linkage rotates is directly proportional to the speed through the water of the EV while running at speed.

In some embodiments, an alternator-generator (AG) assembly, such as in FIG. 4, may include five main components, an AG housing, electronics such as rectifying electronics, a rotor, a stator, and voltage regulation electronics. As the mechanical linkage 160 between the turbine wheel and AG rotates, it mechanically induces a voltage at the output of the AG, as is illustrated in FIG. 2. Voltage is mechanically induced by spinning the AG rotor, which in turn creates electricity in the stator, as shown e.g. in FIG. 4, through the process of electromagnetism, e.g., the interaction of electric currents with respect to induced magnetic fields.

In operation of some embodiments, as the EV speed increases, the voltage output increases until the AG output voltage reaches its maximum sustained voltage (e.g., 48 VDC in some embodiments), as shown in FIG. 2. A voltage output of 48 VDC was chosen for the DRS due to most EV battery charging and electrical distribution systems operating at such voltage level, though of course other voltage levels apply to different embodiments herein. Indeed, such voltage output level can be easily changed to meet the needs of almost any EV electrical distribution and charging system by changing a few simple components.

In one illustrative embodiment, the AG initially produces a bidirectional alternating voltage and current (AC) that must be rectified and converted to direct voltage and current (DC). In some implementations, such converted DC current is necessary to become compatible with the EV electrical distribution and charging system. The AC voltage may be rectified and converted to a unidirectional DC voltage via the rectification electronics and/or bridge rectifier. Exemplary diodes in such bridge rectifier may be arranged in two pairs, for example, with one pair of diodes being switched on to conduct during the positive cycle of the AC signal and the other pair of diodes being switched on during the negative cycle of the AC signal. Such diode arrangement results in a constant DC voltage at the AG output.

Further, smoothing circuitry 230, which may include a smoothing capacitor, may be included to improve the average DC voltage output of the bridge rectifier while reducing the AC voltage variation by filtering the output waveform of the AG. Such smoothing circuitry, e.g., connected in parallel with the battery across the output of the bridge rectifier may aid in increasing the average DC voltage output even higher due to the smoothing circuitry/capacitor also behaving like a storage device in some embodiments.

In some implementations, a voltage regulator 240 may be implemented to monitor the output voltage of the AG to ensure it is kept within acceptable limits. The DC voltage output (e.g., across 150) is then regulated and kept within the tolerances of the desired voltage level by the voltage regulator prior to charging the EV battery. Otherwise, variations in the raw current at the output of the AG have the potential to produce an over-voltage condition and damage components in the EV electrical distribution and charging system.

Figure 7:
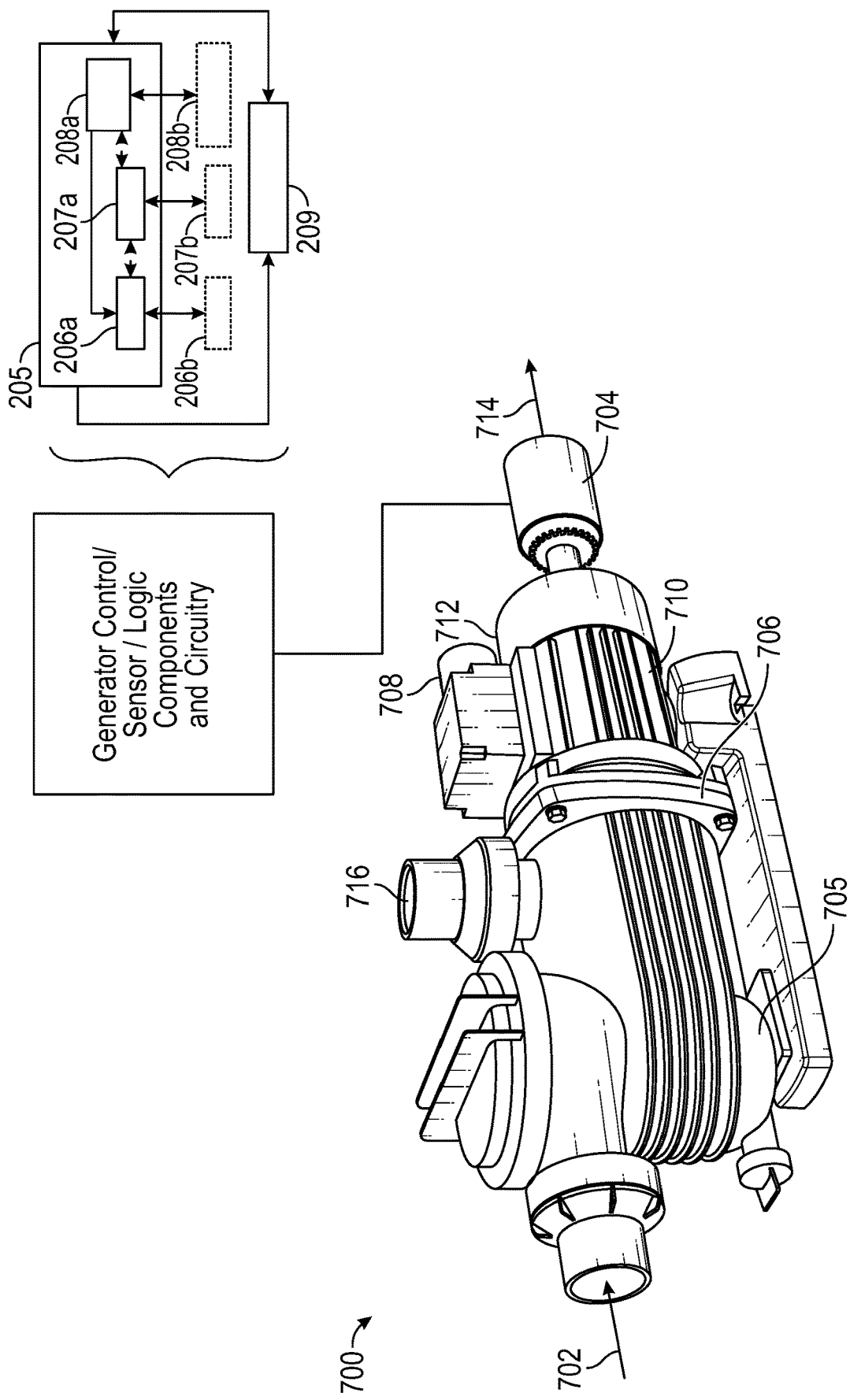
FIG. 7 is a diagram illustrating aspects of an exemplary dynamic recharge system pertaining to embodiments directed to home pool pump implementations, consistent with exemplary aspects of certain embodiments of the disclosed technology.

FIG. 7 is a diagram illustrating aspects of an exemplary dynamic recharge system pertaining to embodiments directed to home pool pump implementations, consistent with exemplary aspects of certain embodiments of the disclosed technology. Referring to FIG. 7, such pool pump embodiments may utilize a generator directly coupled to the rotor of the propeller motor to produce a DC voltage output. This application optimizes the voltage output via the DRS control electronics and can supplement or replace a home's solar panel charging system or backup diesel generator. In solar-powered implementations, by piggybacking on operation of a pump being operated by solar power during the day, for example, dynamic recharge systems herein may recharge a home battery, backup battery, and/or storage component. Moreover, solar panel charging systems are inoperable at night and susceptible to power losses due to dirt and the long run of rooftop electrical cabling connected to the backup battery. Backup generators require a large amount of fuel and space to store the fuel to run for days at a time, e.g., 250 gallons of fuel will last only approximately five to seven days, depending on power consumption.

Furthermore, the generally shorter length of electrical cabling from the generator on the rear of the pool pump to the backup battery is far more efficient than operation using only the solar panel charging system. Furthermore, the pool pump generator is cheaper to install and maintain, e.g., than the solar panel charging system and backup diesel generator applications.

As with other embodiments, the AG of such pool pump embodiments may be mechanically coupled to the pool pump motor via a linkage shaft. As shaft speed increases, the direct current (DC) voltage is produced at the output of the AG. Such output can either be used to charge the home battery or as instantaneous power for other electric loads if the battery is at full charge. As also similar to other embodiments, such pool pump embodiments may comprise the main components noted above and operates using the same principles of electromagnetism.

In operation, as the pool pump speed increases, the voltage output increases until the AG output voltage reaches its maximum sustained voltage (e.g., 48 VDC in the illustrated example), as shown in FIG. 2. Again, however, such voltage output can easily be changed to meet the needs of almost any home battery electrical distribution and charging system by changing a few simple components. Further, the various rectification and smoothing circuitry may operate comparable to that described elsewhere herein. Moreover, voltage regulator circuitry 240 may similarly be included to monitor the output voltage of the AG to ensure it is kept within acceptable limits. The DC voltage output is then regulated and kept within the tolerances of the desired output voltage level by the voltage regulator, e.g., prior to charging the home battery. Otherwise, variations in the raw current at the output of the AG have the potential to produce an over-voltage condition and damage components in the home electrical distribution and charging system.

Figure 8:
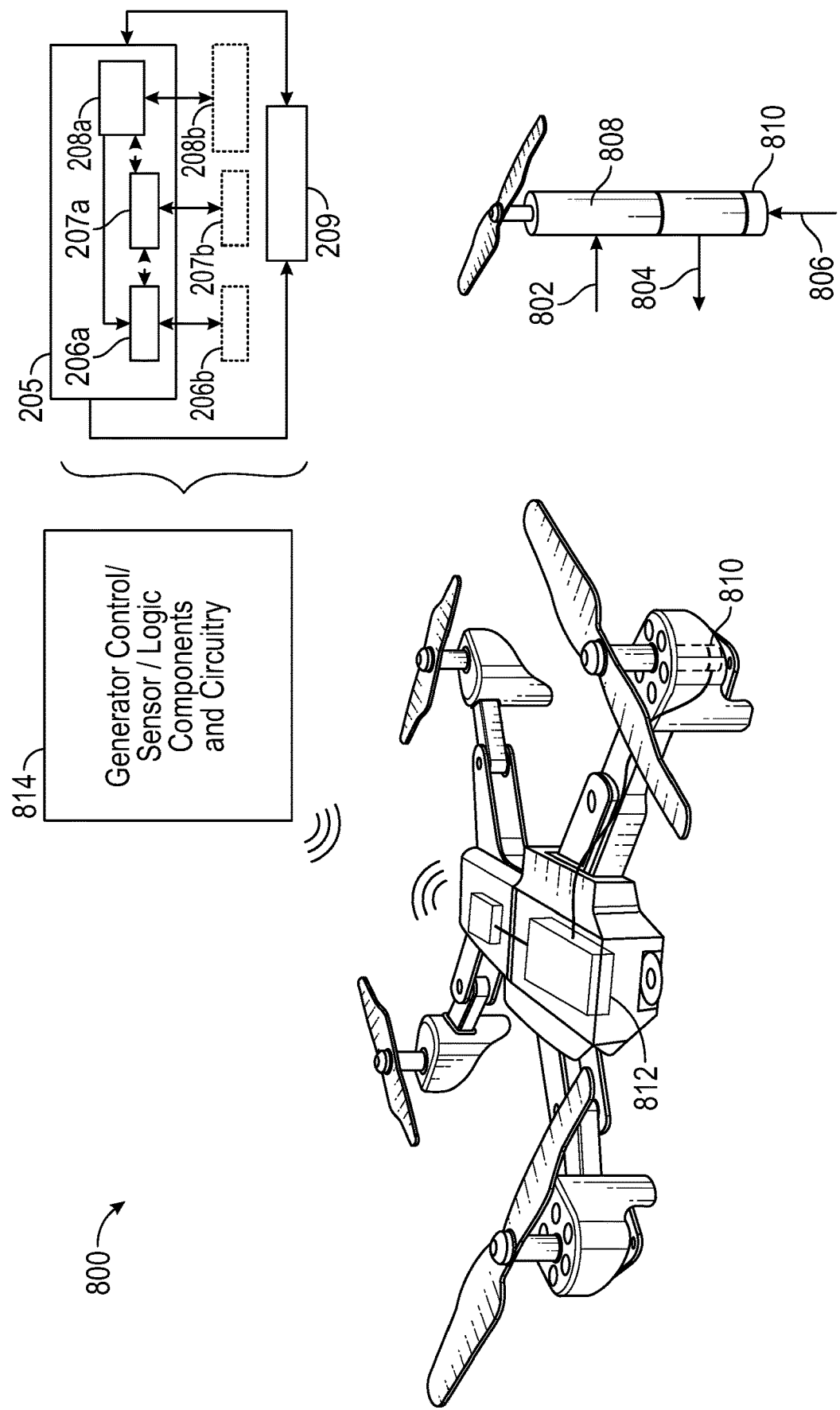
FIG. 8 is a diagram illustrating aspects of an exemplary dynamic recharge system pertaining to embodiments that involve unmanned aerial vehicle (UAV), drone or other such multiple-rotating-shaft containing implementations, consistent with exemplary aspects of certain embodiments of the disclosed technology.

FIG. 8 is a diagram illustrating aspects of an exemplary dynamic recharge system pertaining to embodiments that involve unmanned aerial vehicle (UAV), drone or other such multiple-rotating-shaft containing implementations, consistent with exemplary aspects of certain embodiments of the disclosed technology. Referring to FIG. 8, such UAV/drone embodiments may utilize a generator directly coupled to the rotor of the propeller motor to produce a DC voltage output. Power for charging may be collected and used to recharge batteries based on various rotations of the shaft, such as during descent or slowing of downward velocity. Further, the direct connection to the generator minimizes the power losses and provides more efficient charging for the battery to extend flight time via the DRS control electronics. Consistent with various innovations herein, this application may extend battery charge and flight times from minutes (approximately 30 minutes) to several hours. Accordingly, a UAV/drone implemented using the DRS-connected innovations herein can offer substantial improvements in multiple applications, such as search and rescue, military reconnaissance, and videography, to name a few.

As with other embodiments herein, a drone AG (alternator-generator) may be mechanically coupled to the drone propeller motors via a linkage shaft. As shaft speed increases, a direct current (DC) voltage, here e.g., 12 volts in some embodiments, is produced at the output of the AG. This DC output can either be used to charge the battery or as instantaneous power for other electric loads if the battery is at full charge. Further, as with other embodiments herein, an AG assembly for such drone embodiments may comprise the main components noted in other embodiments herein and may operate by the same principles of electromagnetism. Further, in operation, as the propeller motor speed increases, the voltage output increases until the AG output voltage reaches its maximum sustained voltage (e.g., 12 VDC). Here, while not limiting to other embodiments, a voltage output of 12 VDC was chosen for the DRS due to most drone storage charging and electrical distribution systems working there. The voltage output can easily be changed to meet the needs of almost any drone electrical distribution and charging system by changing a few simple components.

In some embodiments, the AG initially produces a bidirectional alternating voltage and current (AC) that must be rectified and converted to direct voltage and current (DC). Further, the various rectification and smoothing circuitry may be implemented in such circuits, operating comparably to that described elsewhere herein. Moreover, voltage regulator circuitry 240 may similarly be included to monitor the output voltage of the AG to ensure it is kept within acceptable limits. Otherwise, variations in the raw current at the output of the AG have the potential to produce an over-voltage condition and damage components in the EV electrical distribution and charging system.

Figure 9:
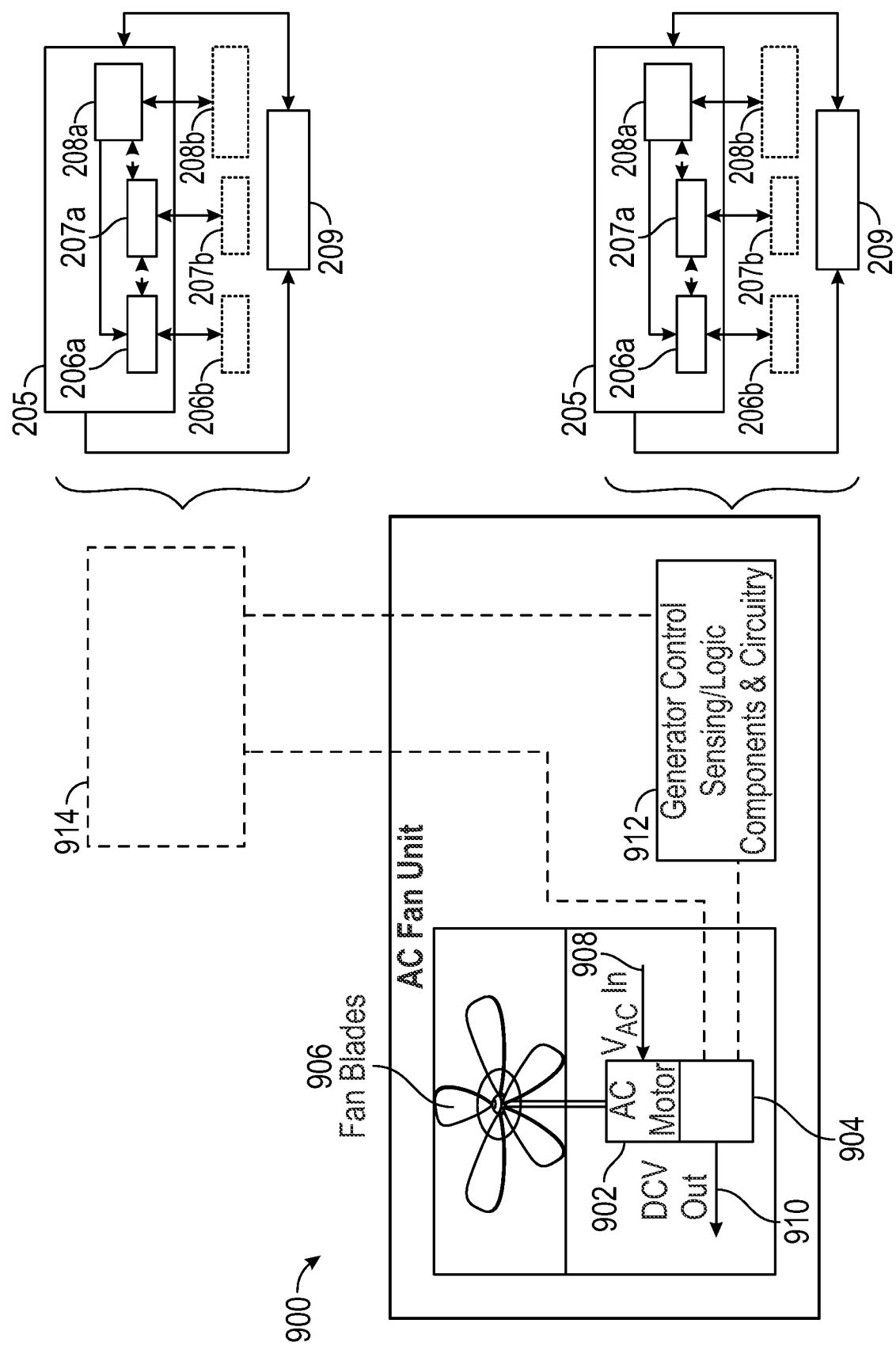
FIG. 9 is a diagram illustrating aspects of an exemplary dynamic recharge system pertaining to embodiments directed to home A/C unit implementations, consistent with exemplary aspects of certain embodiments of the disclosed technology.

FIG. 9 is a diagram illustrating aspects of an exemplary dynamic recharge system pertaining to embodiments directed to home A/C unit implementations, consistent with exemplary aspects of certain embodiments of the disclosed technology. Referring to FIG. 9, such A/C fan unit embodiments may utilize a generator directly coupled to the rotor of the A/C unit fan motor to produce a DC voltage output. This application optimizes the voltage output via the DRS control electronics and can supplement or replace a home's solar panel charging system or backup diesel generator. Tapping or piggybacking the DRS's charging onto the A/C unit while it is being operated during the day via solar power may be implemented for recharging a home battery or home backup battery. Also, solar panel charging systems are inoperable at night and susceptible to dirt and power losses due to the long run of rooftop electrical cabling connected to the backup battery. Further, backup generators require a large amount of fuel and space to store the fuel to run for days at a time, e.g., 250 gallons of fuel will last only approximately five to seven days, depending on power consumption.

Furthermore, performing charging/recharging only across the short length of electrical cabling from the generator on the A/C fan unit to the backup battery is far more efficient than electrical distribution involving the solar panel charging system. Furthermore, the present A/C fan unit generator technology is cheaper to install and maintain than such solar panel charging system and backup diesel generator applications.

Further, as with other embodiments herein, an A/C unit AG (alternator-generator) may be mechanically coupled to the A/C unit motor via a linkage shaft or direct mount. As shaft speed increases, a direct current (DC) voltage, here e.g., 48 volts in some embodiments, is produced at the output of the AG. This DC output can either be used to charge the battery or as instantaneous power for other electric loads if the battery is at full charge. Further, as with other embodiments herein, an AG assembly for such drone embodiments may comprise the main components noted in other embodiments herein and may operate by the same principles of electromagnetism. Further, in operation, as the A/C motor speed increases, the voltage output increases until the AG output voltage reaches its maximum sustained voltage (e.g., 48 VDC). Here, while not limiting to other embodiments, a voltage output of 48 VDC was chosen for the DRS due to many home storage charging and electrical distribution systems working at this voltage level. The voltage output can easily be changed to meet the needs of almost any drone electrical distribution and charging system by changing a few simple components.

In some embodiments, the AG initially produces a bidirectional alternating voltage and current (AC) that must be rectified and converted to direct voltage and current (DC). Further, the various rectification and smoothing circuitry may be implemented in such circuits, operating comparably to the other embodiments described elsewhere herein. Moreover, voltage regulator circuitry 240 may similarly be included to monitor the output voltage of the AG to ensure it is kept within acceptable limits. Otherwise, variations in the raw current at the output of the AG have the potential to produce an over-voltage condition and damage components in the home electrical distribution and charging system.

Referring to the embodiments disclosed and described in connection with FIGS. 1-9, implementations of the dynamic recharge systems herein may utilize any type of motor generator, or a combination thereof, to create the relative motion between the rotor and stator such that the generator can induce an electrical voltage output. According to the disclosed technology, the most common types of motor generators are radial, axial, and transverse flux generator applications. In many disclosed embodiments, dynamic recharge systems herein will normally use axial and transverse flux motor generators due to such generator structures being more efficient and producing a higher torque while reducing its overall footprint.

In connection with FIG. 6, implementations of such boat DRS embodiments benefit the most from using a transverse flux generator. Here, for example, such transverse flux characteristics allow the boat DRS to take advantage of higher torques and more efficiency at low speeds while eliminating some of the cooling requirements of the other generator types. Furthermore, a transverse flux generator is an ideal fit to mount circumferentially around the propeller shaft for space savings in the engine compartment.

In connection with FIG. 7, implementations of such pool pump DRS embodiments are often constructed most efficiently utilizing radial or axial flux generators. Further, according to some embodiments, axial flux generator embodiments may be used in implementations when savings of space and/or weight are important, e.g., whenever they are a concern.

In connection with FIG. 8, such UAV/drone DRS embodiments may be constructed using axial flux motor generator in certain implementations. Here, for example, such axial flux generators are ideal for smaller-size applications and have a higher power density, shorter magnetic path yielding increased efficiency, better cooling, and develops 30-40% more torque than a similarly sized radial flux generator in some implementations.

In connection with FIG. 9, such air conditioning fan unit DRS embodiments will often use radial or axial flux generators in various implementations. Further, in implementations that entail saving space and/or weight, axial type flux generators may be utilized to save space/weight whenever they are a concern.

Figure 10A:
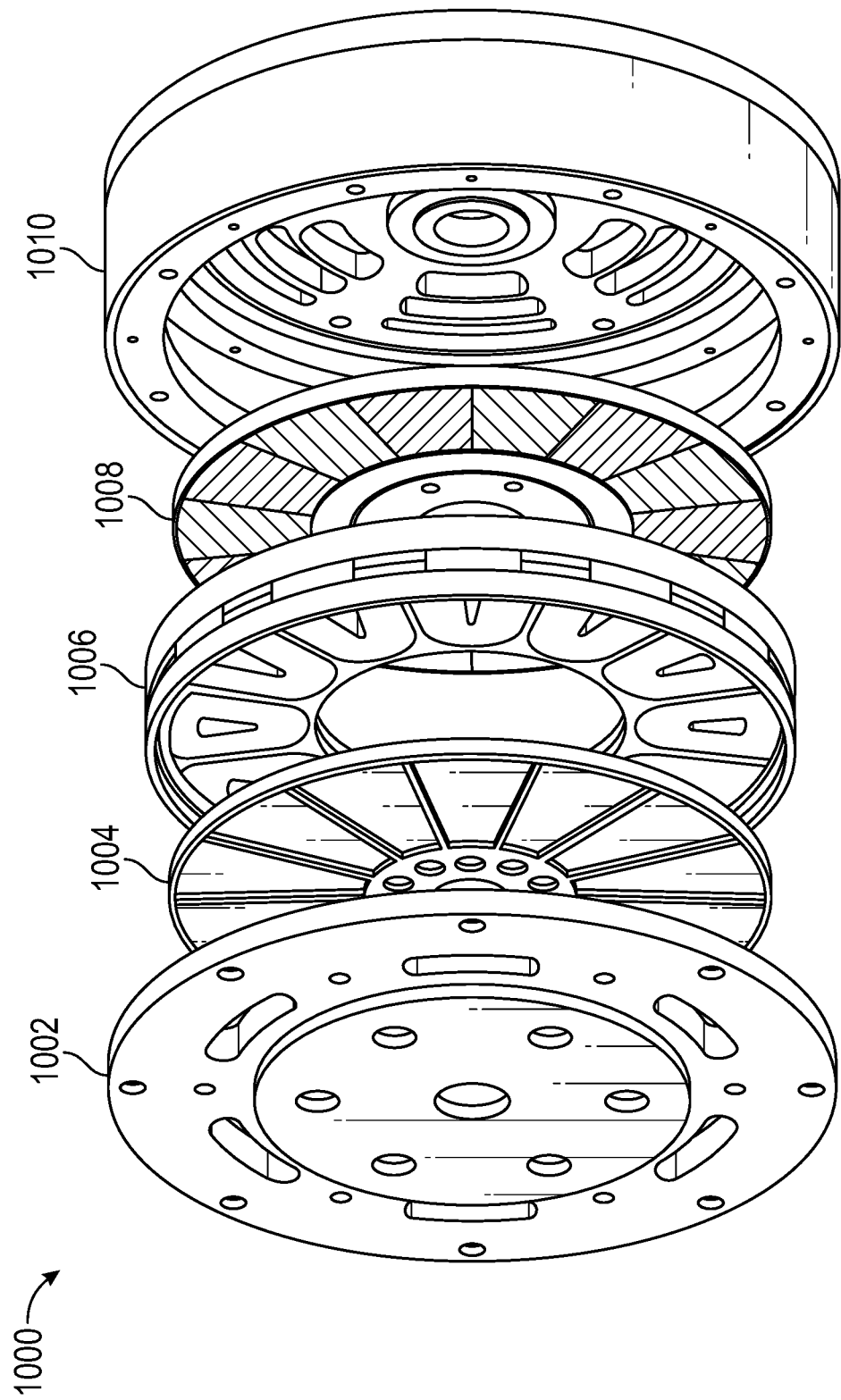
FIGS. 10A-10B are diagrams illustrating exemplary aspects of generator assemblies having axial flux generators as associated with dynamic recharge systems consistent with exemplary aspects of certain embodiments of the disclosed technology.
Figure 10B:
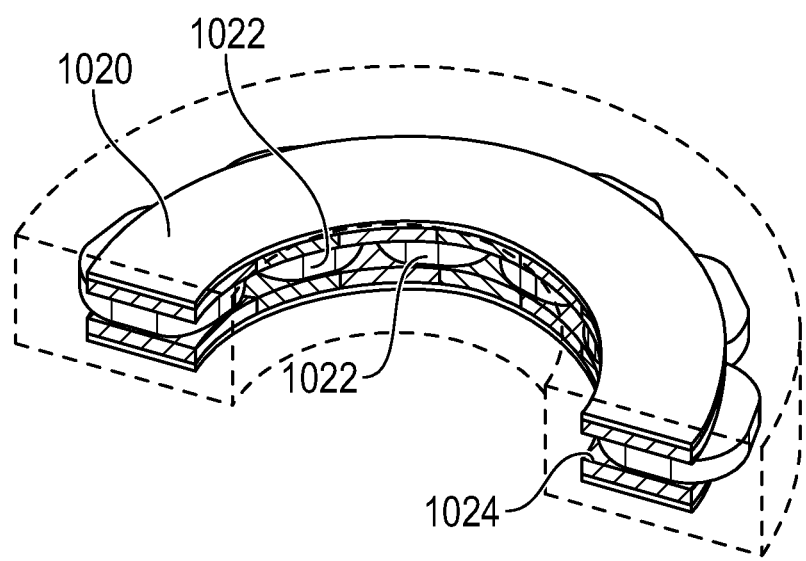

FIGS. 10A-10B are diagrams illustrating exemplary aspects of generator assemblies having axial flux generators as associated with dynamic recharge systems consistent with exemplary aspects of certain embodiments of the disclosed technology. Referring to FIG. 10A, an illustrative axial flux generator 1000 may comprise a generator cover 1002, a first rotor element 1004 (on left side of FIG. 10A), a stator 1006, a second rotor element 1008 (on right side of FIG. 10A), and a housing 1010. Referring to FIG. 10B, subcomponents of the axial flux generator are arranged such that the magnets 1024 of the rotor 1020 are arranged in planes parallel to the coils 1022, i.e., on the stator 1006 shown in FIG. 10A. In operation of such axial flux generator 1000 as utilized in the disclosed technology, as the motor generator shaft spins, the generator rotor spins, creating relative motion between the rotor magnets and stator coils, thereby mechanically inducing voltage at the generator's output via the stator coils. Accordingly, consistent with embodiments herein, such voltage is mechanically induced by the spinning generator rotor, which creates electricity in the stator coils through electromagnetism, i.e., the inducements of electric currents in the stator coils stemming from changes to the magnetic field of the stator coil caused by interaction with the changing magnetic field(s) of the rotating magnets.

Figure 11A:
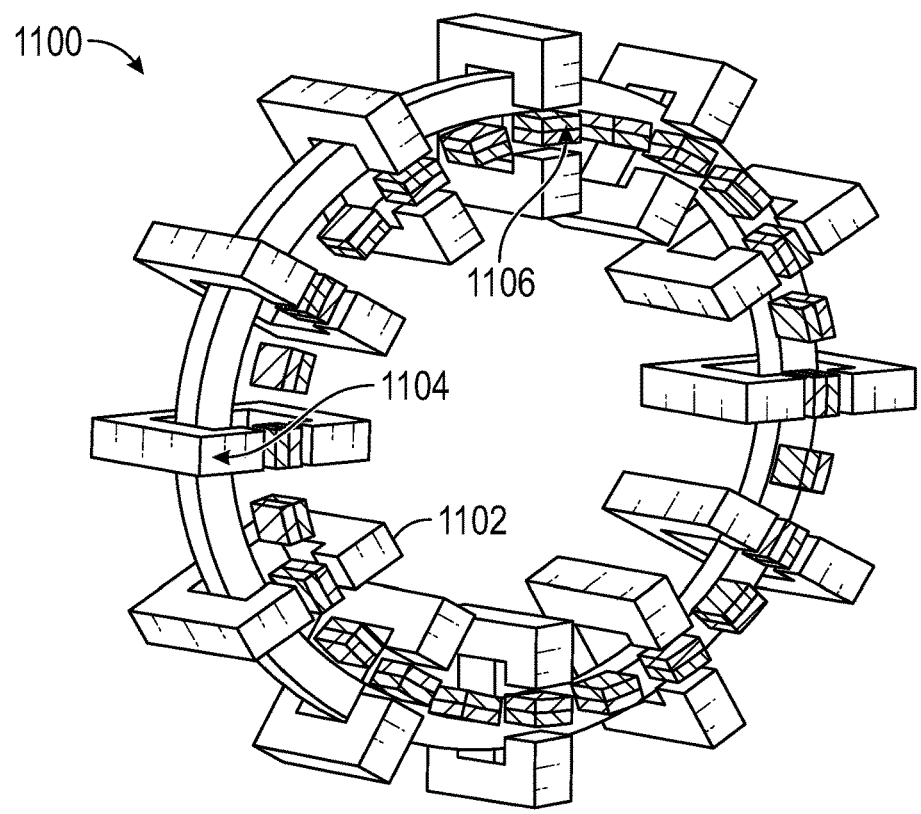
FIGS. 11A-11C are diagrams illustrating exemplary aspects of generator assemblies having transverse flux generators as associated with dynamic recharge systems consistent with exemplary aspects of certain embodiments of the disclosed technology.
Figure 11B:
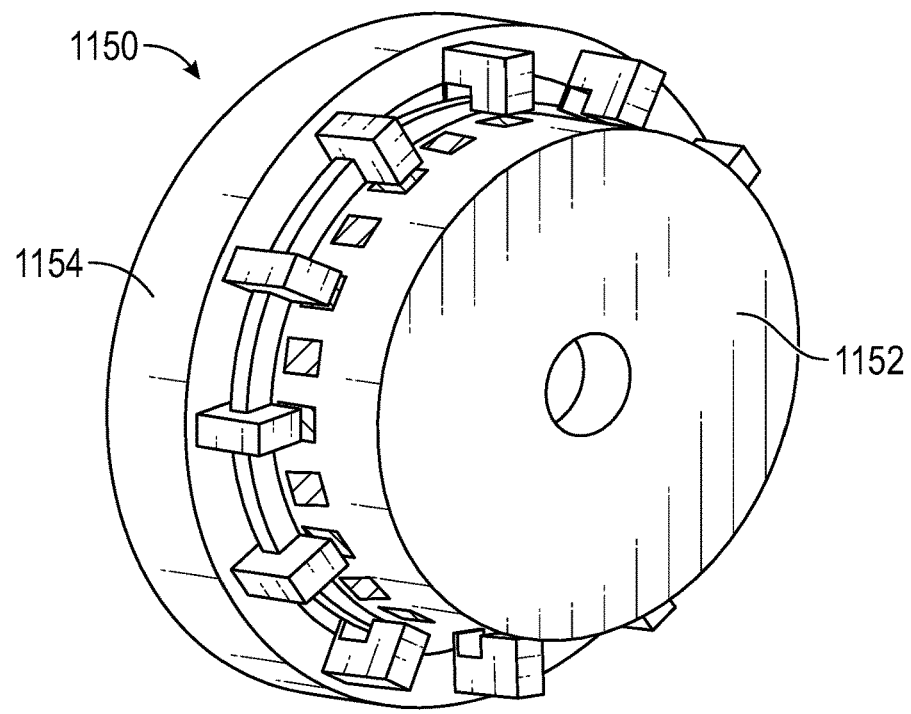
Figure 11C:
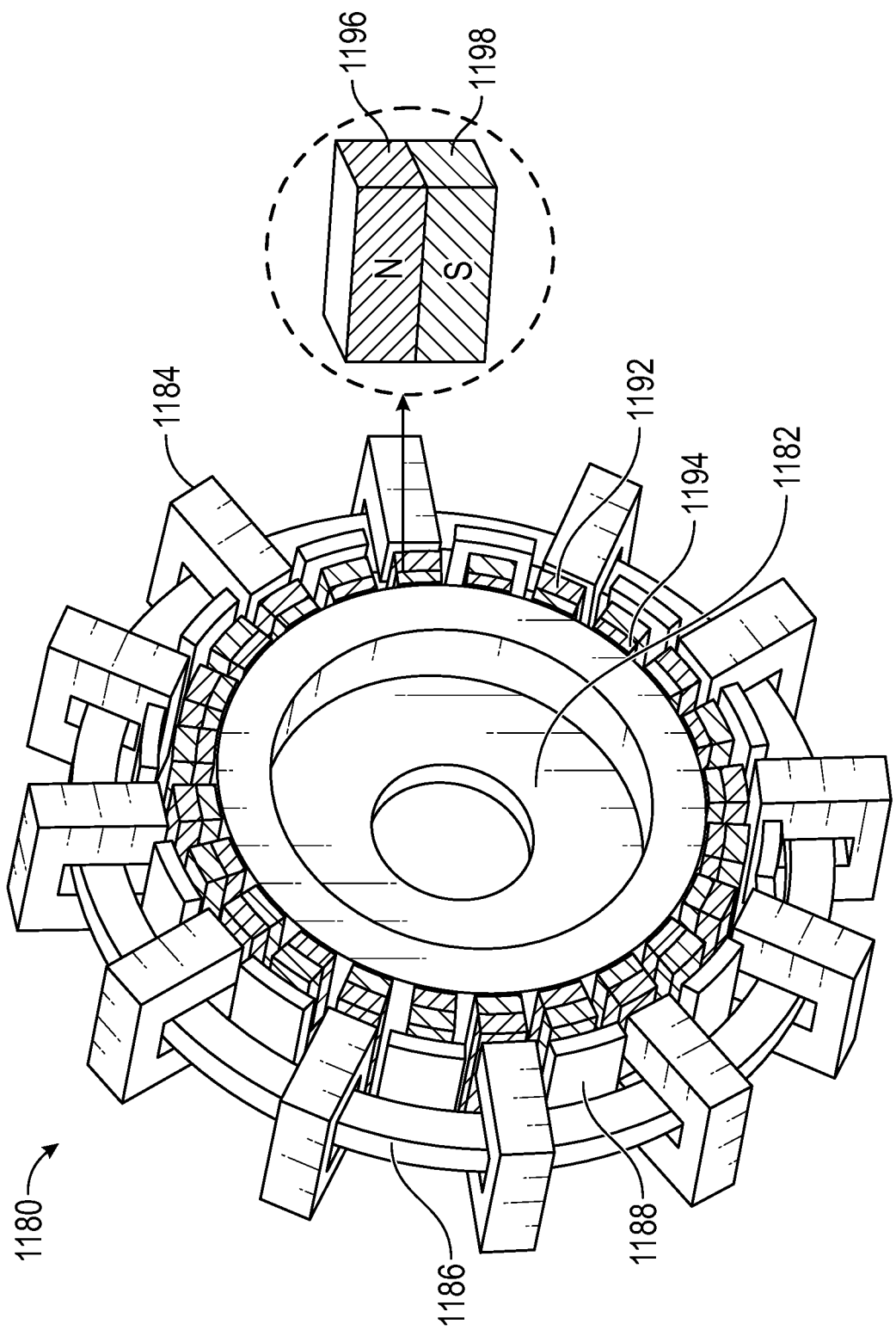

FIGS. 11A-11C are diagrams illustrating exemplary aspects of generator assemblies having transverse flux generators as associated with dynamic recharge systems consistent with exemplary aspects of certain embodiments of the disclosed technology. Referring to the exemplary implementations of FIGS. 11A-11C, one illustrative embodiments of a transverse flux generator consistent with the disclosed technology is shown, including a rotor housing 1152, a stator housing 1154, a rotor core 1182, a stator core 1104, a stator coil 1186, magnets 1106, and an iron bridge 1188. According to operation of such transverse flux generators 1100 utilized in the disclosed technology, as the rotor core spins, opposite pole magnets rotate into/enter the C-shaped stator core 1104, repeatedly flipping the direction of the magnetic flux in the C-shaped stator core 1104. These repeated oscillations of flux, e.g., in the direction of the magnetic flux, are caused by the relative motion between the magnets attached to the rotor and the stator coil. As such, presence of the stator coil wire in the surrounding magnetic field induces an output from the stator coil wire in the form of an alternating current. In some embodiments, an iron bridge or similar electromagnetic component may be added/utilized to help prevent magnetic flux leakage in the stator, thereby increasing the generator's efficiency. Here, such component may help prevent magnetic flux leakage, e.g., by minimizing magnetic flux that does not follow the intended path in a magnetic circuit.

As disclosed herein, embodiments and features of the present inventions may be implemented through computer-hardware, software and/or firmware. For example, the systems and methods disclosed herein may be embodied in various forms including, for example, one or more data processors, such as circuitry, computer(s), computing modules and the like, and may also include or access at least one database, digital electronic circuitry, firmware, software, or in combinations of them. Further, while some of the disclosed implementations describe specific (e.g., hardware, etc.) components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various processes and operations according to the inventions or they may include a general-purpose computer or computing platform selectively activated or reconfigured by code to provide the necessary functionality. The processes disclosed herein are not inherently related to any particular computer hardware, communication/network, device, architecture, environment, or other apparatus, and may be implemented by a suitable combination of hardware, software, and/or firmware. For example, various general-purpose machines may be used with programs written in accordance with teachings of the inventions, or it may be more convenient to construct a specialized apparatus or system to perform the required methods and techniques.

In the present description, the terms component, module, device, etc. may refer to any type of logical or functional device, process or blocks that may be implemented in a variety of ways. For example, the functions of various blocks can be combined with one another and/or distributed into any other number of modules. Each module can be implemented as a software program stored on a tangible memory (e.g., random access memory, read only memory, CD-ROM memory, hard disk drive) within or associated with the computing elements, sensors, connections/connectors, etc. disclosed above, e.g., to be read by a processing unit to implement the functions of the innovations herein. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits. Some other possibilities for implementing aspects may include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy logic, neural networks, other AI (Artificial Intelligence) or machine learning systems, quantum devices, and hybrids of any of the above device types.

It should also be noted that various logic and/or features disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in tangible various forms (e.g., optical, magnetic or semiconductor storage media), though do not encompass transitory media.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Other implementations and embodiments of the inventions herein will be apparent to those skilled in the art from consideration of the specification and practice of the innovations disclosed herein. It is intended that the specification and examples be considered as exemplary only, with a true scope and spirit of the inventions being indicated by the present disclosure and various associated principles of related patent doctrine.

The invention claimed is:

1. An electro-mechanical power system for an electric vehicle (EV), the system comprising:
    an electric vehicle motor (EV motor) that drives a shaft that provides mechanical or electrical power to the electric vehicle;
    an EV battery module coupled to the EV motor and configured to deliver electric power to the EV motor;
    a dynamic recharge system (DRS) connected to the EV battery module, the DRS comprises:
      an ambient air intake;
      a turbo coupled to the air intake and including a turboshaft that is spun via airflow from the air intake, wherein the turbo uses the airflow across the turbine blades as the mode of force to generate the torque to spin the motor generator rotor to create power that is used to charge the EV battery module and/or to provide instantaneous power to the EV motor; and
    a generator assembly including a generator and a generator control module, wherein the generator includes: a motor having a rotor mechanically linked or coupled to the turbo shaft or a motor shaft and receiving rotational energy (torque) from the turbo shaft or the motor shaft, and a stator that converts the rotational energy to electrical power;
    wherein the generator control module includes control electronics that manage and provide the electrical power as an output to the EV battery module and/or the EV motor;
    wherein the DRS further comprises air cooler exhaust tubing that directs the airflow exiting the turbo over the EV battery module and/or the brake rotor and thereby provides additional cooling of at least one battery of the EV battery module and/or the brake rotor;
    wherein the DRS further comprised smoothing circuitry within the generator control electronics and configured to provide a constant DC output, wherein the smoothing circuitry is coupled between the motor and the output.

2. The system of claim 1, wherein the smoothing circuitry includes a bridge rectifier and at least one smoothing capacitor.

3. The system of claim 1, wherein the EV battery module is further configured to deliver direct electric power to other loads when the EV battery has a full or nearly full electrical charge.

4. The system of claim 1, wherein as the generator rotor spins, the DRS control electronics monitor an AC voltage output from one or more coils to charge the EV battery via rectified DC voltage output, wherein the DRS control electronics further act as a charging controller by securing a battery charging cycle when the battery reaches full charge.

5. The system of claim 1, wherein as the generator rotor spins, the DRS control electronics monitor a DC voltage output from one or more coils to supply power to other loads onboard the EV, wherein the DRS control electronics prioritize which non-vital loads get power and at which time(s) the non-vital loads get power.

6. The system of claim 1, wherein the DRS is configured to function in a hybrid application alongside an internal combustion engine (ICE) to extend the hybrid vehicle range when in battery-only mode.

7. The system of claim 1, wherein the generator is of a radial flux type.

8. The system of claim 1, wherein the generator is of an axial flux type.

9. The system of claim 1, wherein the generator is of a transverse flux type.

10. The system of claim 1, wherein the rotor and the rotor magnets are integral with the propellor shaft.

11. An electro-mechanical power system for an electric vehicle (EV) having a propeller drive, the system comprising:
    an electric vehicle motor (EV motor) that drives a propellor shaft that provides mechanical and/or electrical power to the electric vehicle,
    wherein the propellor shaft rotates;
    an EV battery module coupled to the EV motor and configured to deliver electric power to the EV motor;
    a dynamic recharge system (DRS) coupled to the EV battery module, the DRS comprising:
      a generator assembly including a transverse flux generator and a generator control module, the transverse flux generator component mounted circumferentially around the propeller shaft, the generator component including:
        a rotor mounted around the propellor shaft and having rotor magnets positioned on an outside diameter of the rotor and directed outward away from an axis of the propellor shaft so as to generate, responsive to rotational movement of the propellor shaft, an electromagnetic flux; and
        a stator including one or more coils arranged external to the rotor and positioned to convert the electromagnetic flux to electrical energy responsive to rotation of the rotor magnets within the one or more coils;
wherein the electrical energy is used to charge the EV battery module and/or to provide instantaneous power to the EV motor; and
wherein the generator control module includes control electronics that manage and provide the electrical energy as an output to the EV battery module and/or the EV motor;
wherein the rotor and the rotor magnets are integral with the propellor shaft;
wherein the stator of the transverse flux generator is mounted externally to the rotor in a direction away from the propellor shaft such that it is spaced, radially outward from the rotor, wherein external outward edges of the stator and motor are exposed to ambient air along an outward, generally cylindrical surface such that air cooling is achieved across a full range of the cylindrical surface, thereby avoiding a need for a dedicated cooling element to cool the generator.

12. The system of claim 11, wherein the DRS further comprises:
an air cooler exhaust that directs the airflow over the EV battery module and/or the brake rotor and thereby provides additional cooling of at least one battery of the EV battery module and/or the brake rotor.

13. The system of claim 11, wherein the rotor, as a function of speed of the propellor shafter below about 1,500 rpm and/or loads on the propellor shaft via load of water on/against propellor, captures transverse flux characteristics present at higher torques and/or lower speeds.

14. The system of claim 11, wherein the generator is of a same flux type as the motor or any combination of radial, axial, or transverse-flux type embodiments.

15. The system of claim 11, wherein the generator is of a radial flux type.

16. The system of claim 11, wherein the generator is of a transverse flux type.

17. The system of claim 11, wherein the generator is of a same flux type as the motor or any combination of radial, axial, or transverse-type embodiments.

18. The system of claim 11, wherein as the generator rotor spins, the DRS control electronics monitor an AC voltage output from one or more coils to charge the EV battery via rectified DC voltage output, wherein the DRS control electronics further act as a charging controller by securing a battery charging cycle when the battery reaches full charge.

19. The system of claim 11, wherein as the generator rotor spins, the DRS control electronics monitor a DC voltage output from one or more coils to supply power to other loads onboard the EV, wherein the DRS control electronics prioritize which non-vital loads get power and at which time(s) the non-vital loads get power.

20. The system of claim 11, wherein the DRS is configured to function in a hybrid application alongside an internal combustion engine (ICE) to extend the hybrid vehicle range when in battery-only mode.

* * * * *